(12) United States Patent
Hutson

(10) Patent No.: US 9,038,695 B2
(45) Date of Patent: May 26, 2015

(54) WINDOW PROTECTION APPARATUS FOR AN OPERATOR CABIN OF A WORKING MACHINE

(71) Applicant: Jed R. T. Hutson, Inglis (CA)

(72) Inventor: Jed R. T. Hutson, Inglis (CA)

( * ) Notice: Subject to any disclaimer, the term of this patent is extended or adjusted under 35 U.S.C. 154(b) by 78 days.

(21) Appl. No.: 13/860,163

(22) Filed: Apr. 10, 2013

(65) Prior Publication Data

US 2013/0269884 A1    Oct. 17, 2013

Related U.S. Application Data

(60) Provisional application No. 61/622,766, filed on Apr. 11, 2012.

(51) Int. Cl.
*E06B 3/32* (2006.01)
*B60J 1/20* (2006.01)

(52) U.S. Cl.
CPC .......................................... *B60J 1/20* (2013.01)

(58) Field of Classification Search
USPC ................. 160/98, 370.22, 290.1; 180/89.12; 296/190.1, 190.03, 95.1, 97.8
See application file for complete search history.

(56) References Cited

U.S. PATENT DOCUMENTS

| | | |
|---|---|---|
| 1,461,478 A | 7/1923 | Daniels |
| 1,823,290 A * | 9/1931 | Prawalsky ........................ 160/98 |
| 2,723,714 A | 11/1955 | Moore |
| 2,851,303 A | 9/1958 | McQueen |
| 3,088,772 A | 5/1963 | Francis |
| 3,095,034 A | 6/1963 | Francis |
| 3,292,684 A | 12/1966 | Jines |
| 3,454,300 A | 7/1969 | Pugsley et al. |
| 4,229,035 A | 10/1980 | Newman |
| 4,688,846 A * | 8/1987 | Martin, Jr. ...................... 296/102 |
| 5,286,081 A * | 2/1994 | Martin, Jr. ............... 296/190.08 |
| 5,441,095 A | 8/1995 | Trethewey |
| 5,954,384 A | 9/1999 | Jones |
| 6,318,789 B1 | 11/2001 | Stuart |
| 2009/0212589 A1* | 8/2009 | Winstanley ................. 296/97.8 |
| 2013/0269884 A1* | 10/2013 | Hutson ....................... 160/290.1 |

* cited by examiner

*Primary Examiner* — Blair M. Johnson
(74) *Attorney, Agent, or Firm* — Kyle R. Satterthwait; Ryan W. Dupuis; Ade & Company Inc

(57) ABSTRACT

A window protection apparatus on a working machine features a reel rotatably supported at an exterior of the operator cabin in a position proximate a top end of the window for rotation about a horizontal axis and a flexible window covering wound on the reel such that rotation of the reel in a first direction deploys a free end of the window covering from the reel, and rotation of the reel in an opposite second direction retracts the free end of the window covering back toward said reel. A retaining member is mounted at the exterior of the operator cabin in a position proximate a bottom end of the window, and a retaining element is attached to the window covering proximate the free end thereof for engagement with the retaining member to secure the window covering in a closed position spanning downwardly from the reel over the window.

19 Claims, 4 Drawing Sheets

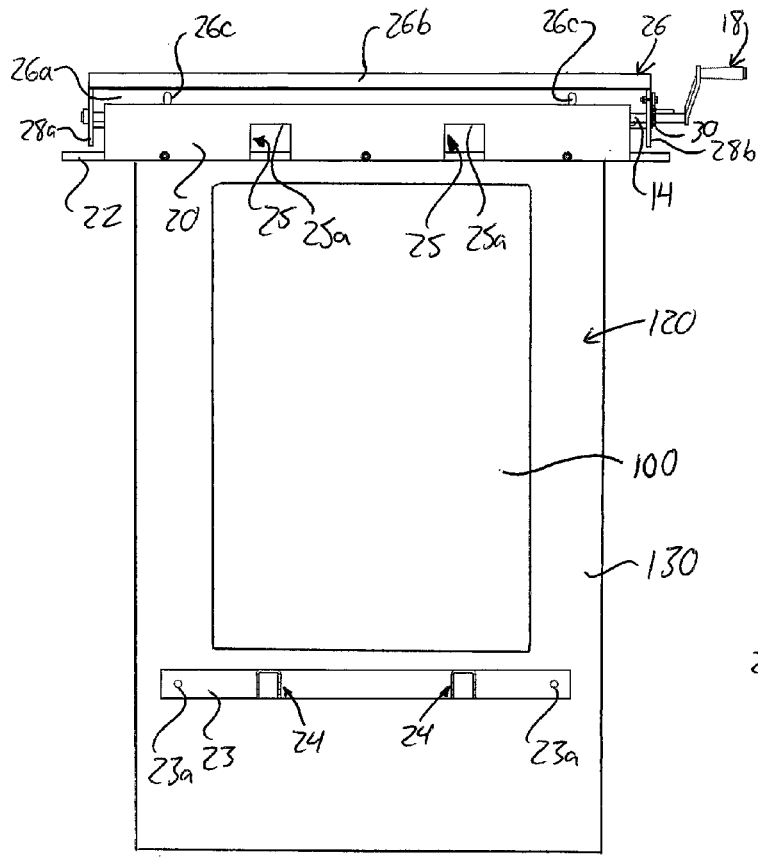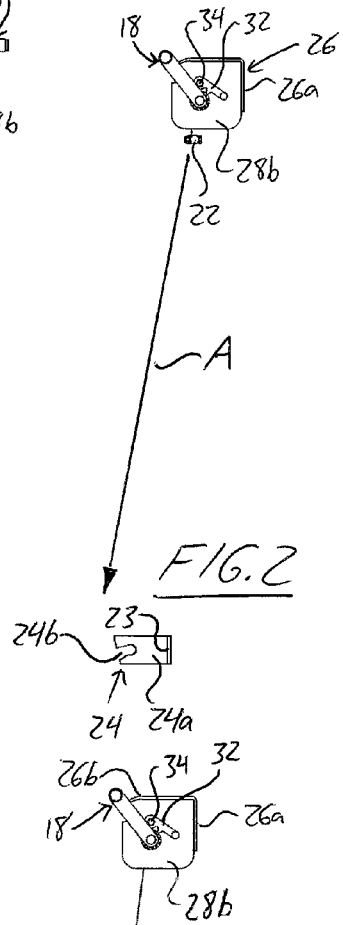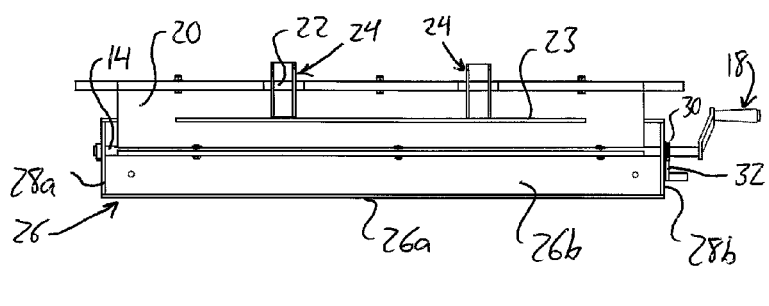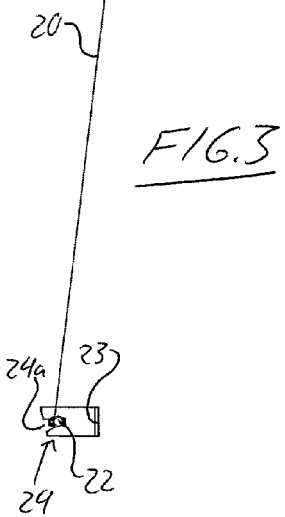

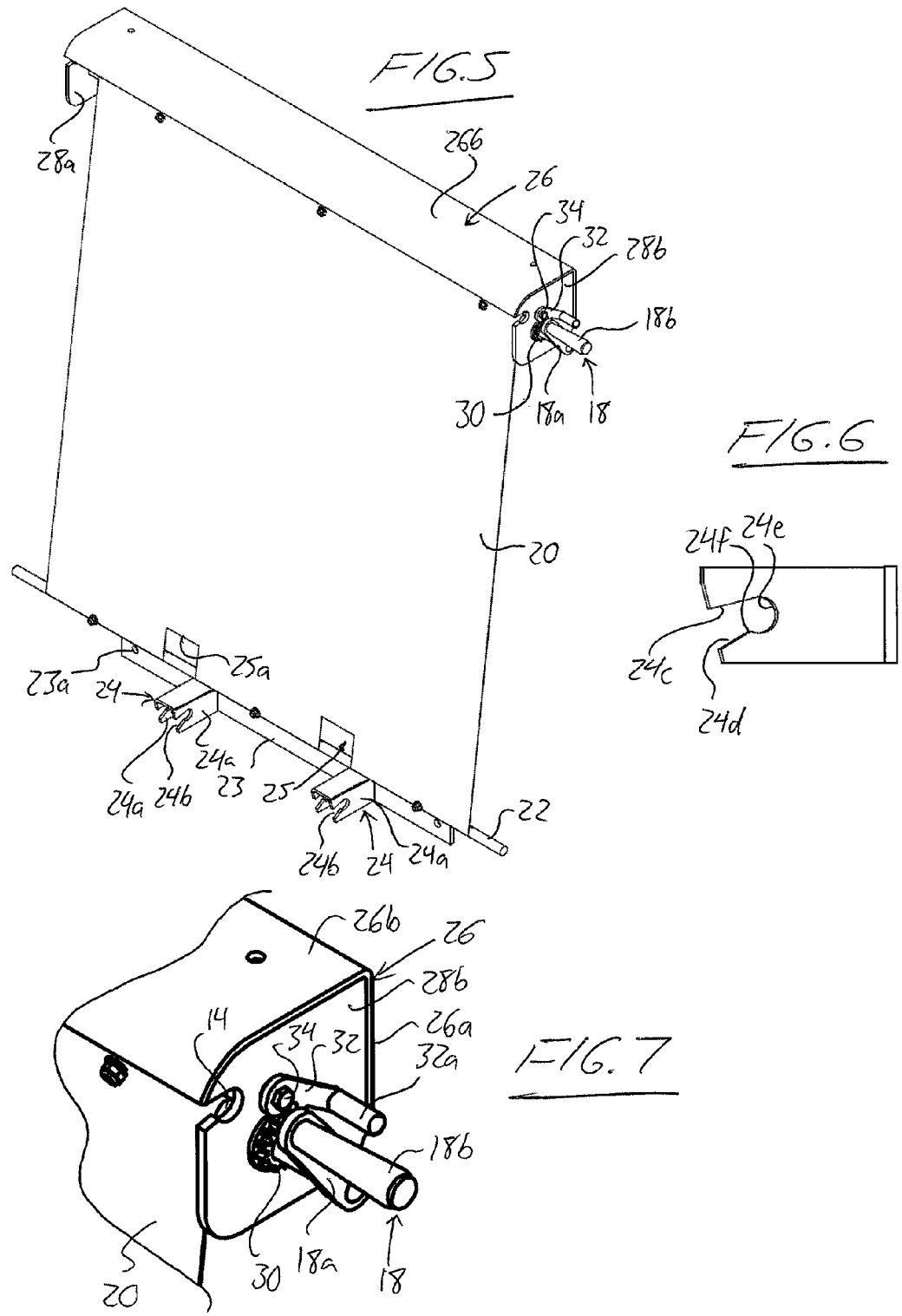

WINDOW PROTECTION APPARATUS FOR AN OPERATOR CABIN OF A WORKING MACHINE

CROSS REFERENCE TO RELATED APPLICATIONS

This application claims benefit under 35 U.S.C. 119(e) of U.S. Provisional Patent Application Ser. No. 61/622,766, filed Apr. 11, 2012, the entirety of which is incorporated herein by reference.

FIELD OF THE INVENTION

The present invention relates generally to window protection for working machines, for example to protect an operator cabin window from stone chips during transport of the working machine on an open air trailer, and more particularly to such an apparatus employing a reel-carried retractable window cover.

BACKGROUND OF THE INVENTION

It is commonplace for working machines (skid steers, excavators, plows, tractors, etc.) to have enclosed operator cabins with one or more glass windows. Some working machines, particularly smaller scale machines such as skid steers, are commonly transported to and from a worksite on an open-air trailer towed by a larger vehicle more suited to high-speed road travel. A known problem arising in such situations is the occurrence of window damage to the skid steer during travel, for example by stones kicked up from the roadway from traffic ahead of the tow vehicle and thus effectively acting as a projectile that can cause cracking or chipping of glass windows on the forward-moving tow vehicle and the working machine towed therebehind. Accordingly, it is desirable to provide protection for windows of such working machines during transport, particularly for the front windows that typically face forward during travel.

Applicant has developed a unique window protection apparatus useful for such applications.

SUMMARY OF THE INVENTION

According to a first aspect of the invention there is provided a window protection apparatus for an operator cabin of a working machine, the window protection apparatus comprising:

a reel arranged for rotatable support at an exterior of the operator cabin of the working machine in a position proximate a top end of a window of said operator cabin for rotation about a horizontal axis;

a flexible window covering wound on the reel such that rotation of the reel in a first direction deploys a free end of the window covering from the reel, and rotation of the reel in an opposite second direction retracts the free end of the window covering back toward said reel; and a retaining member arranged for mounting at the exterior of the operator cabin in a position proximate a bottom end of the window of said operator cabin; and a retaining element attached to the window covering proximate the free end thereof and respectively engagable with the retaining member to secure the window covering in a closed position spanning downwardly from the reel over the window.

Preferably there is provided a locking mechanism operable to prevent rotation of the reel in the first direction with the window covering in the closed position.

Preferably the locking mechanism comprises a ratchet mechanism operable to prevent rotation of the reel in only the first direction, whereby the reel is rotatable in the second direction with the window covering secured in the closed position to tension the window covering between the reel and the one or more retaining elements.

Preferably the retaining element comprises an elongated rigid member running along the free end of the window covering.

Preferably the retaining member comprises a lug arranged to project from the operator cabin and define an opening into which the retaining element is receivable.

The elongated rigid member may jut laterally outward from the opposite sides of the window covering to engage with two retaining members at opposite sides of the window of the operator cabin.

In one embodiment, each lug is arranged to orient the opening therein in a direction facing across the window of the operator cabin.

Preferably there are provided mounting features on which the reel is carried, the mounting features being arranged to enable fastening to the working machine without modification thereof.

Preferably the mounting features comprise bracket portions having fastener openings therein suitably positioned to align with existing fastener-receiving openings of the working machine.

The working machine may comprise headlamp mounts projecting forwardly from the operator cabin above the window thereof to define the fastener-receiving openings through which headlamps are fastenable to the headlamp mounts, in which case the bracket portions of the apparatus are preferably arranged to align the fastening openings therein with the fastener-receiving openings of the headlamp mounts.

According to a second aspect of the invention there is provided a window protection apparatus on a working machine having an operator cabin with a window, the window protection apparatus comprising:

a reel rotatably supported at an exterior of the operator cabin in a position proximate a top end of the window for rotation about a horizontal axis;

a flexible window covering wound on the reel such that rotation of the reel in a first direction deploys a free end of the window covering from the reel, and rotation of the reel in an opposite second direction retracts the free end of the window covering back toward said reel;

a retaining member mounted at the exterior of the operator cabin in a position proximate a bottom end of the window; and a retaining elements attached to the window covering proximate the free end thereof and respectively engagable with the one or more retaining members to secure the window covering in a closed position spanning downwardly from the reel over the window.

BRIEF DESCRIPTION OF THE DRAWINGS

In the accompanying drawings, which illustrate exemplary embodiments of the present invention:

FIG. 1 is a schematic front elevational view of an operator cabin of a skid steer on which a first embodiment window protection apparatus of the present invention has been installed to protect the front window of the operator cabin during transport of the skid steer on an open-air trailer, the window protection apparatus being shown in an open state in which the window is uncovered.

FIG. 2 is a schematic side elevational view of the first embodiment window protection apparatus of FIG. 1, with the skid steer operator cabinet omitted for ease of illustration.

FIG. 3 is a schematic side elevational view of the first embodiment window protection apparatus of FIG. 2 in a closed state for covering the window of the skid steer operator cabin, which is again omitted for ease of illustration.

FIG. 4 is a schematic bottom plan view of the first embodiment window protection apparatus of FIG. 3.

FIG. 5 is a perspective view of the first embodiment window protection apparatus in a partially extended state during closing thereof.

FIG. 6 is a side view of a retaining member bracket of the first embodiment window protection apparatus of FIGS. 1 through 5.

FIG. 7 is a schematic side perspective view of the first embodiment window protection apparatus of FIGS. 1 through 5 showing a ratchet mechanism thereof.

DETAILED DESCRIPTION

Figure 8:
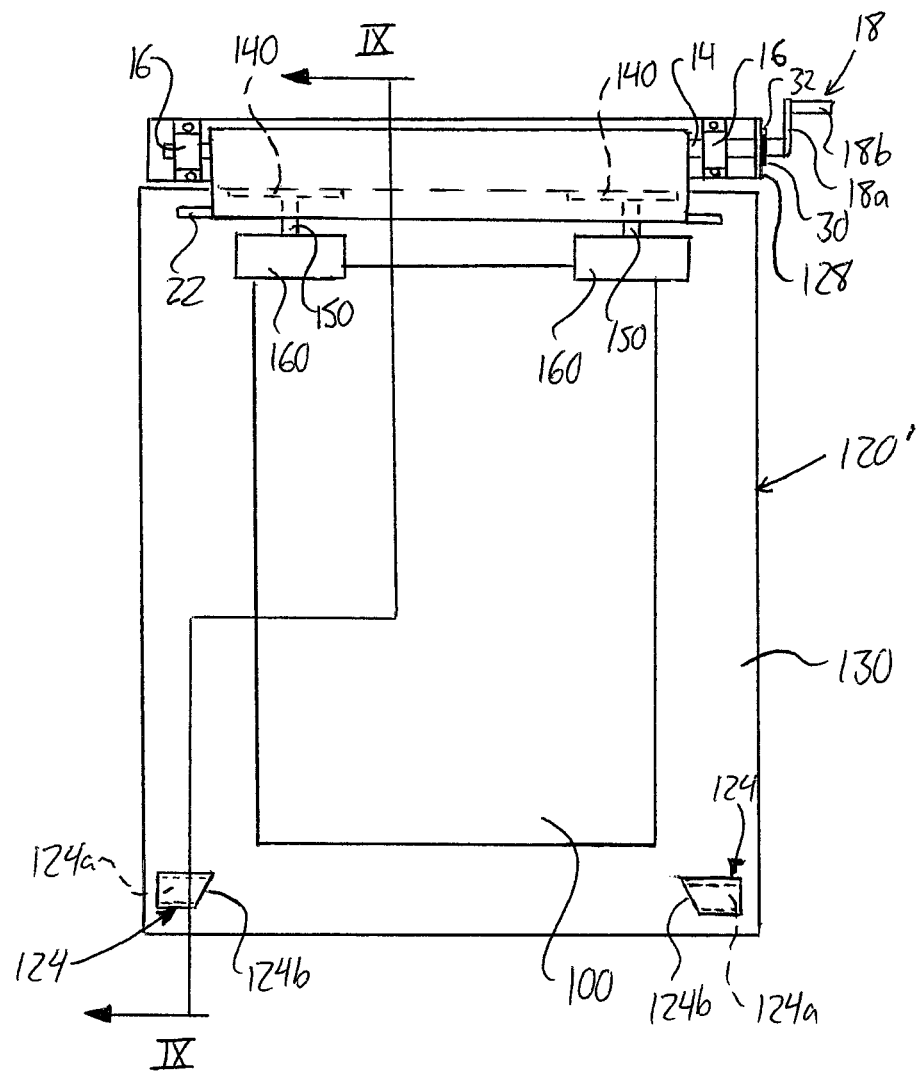
FIG. 8 is a schematic front elevational view of a second embodiment window protection apparatus, illustrating mounting thereof on the skid steer using existing headlamp mounts thereof to avoid need for welding to, or modification of, the skid steer.

FIG. 1 illustrates a window protection apparatus of one embodiment of the present invention installed to project the front window 100 of the operator cabin 120 of a skid steer or other working machine. Such working machines include those having a ground working implement or exterior attachment carried outside an operator's cabin by an operator-controllable manipulation mechanism whose movement is driven by one or more actuators controllable by the machine operator from inside the operator cabin. For example, skid steers typically employ a pair of lift arms on opposing sides of the operator cabin that can be raised and lowered through use of hydraulic cylinder actuators controllable from the operator cabin to raise and lower a bucket or other implement or attachment carried in front of the operator cabin at the distal ends of these arms. An additional pair of hydraulic cylinder actuators respectively carried on the arms near the distal ends are also operator controlled, for example being coupled to the bucket or other implement/attachment to allow controlled tiling thereof relative to the arms to increase the manipulative control achievable by the operator. However, the present invention is not limited to lift-arm working machines, and may be used on other working machines used for various ground-working, load-lifting and other work tasks in construction and other fields in which such machinery is employed.

Turning back to the details of the present invention, a horizontal shaft 14 is rotatably supported by a support frame or housing 26 in a position a short distance in front of the front wall 130 of the operator cabin a short height above the front window 100 mounted in the front wall 130. The length of the shaft exceeds the width of the window 100 to extend outwardly beyond each side of the window. One end of the shaft has a generally L-shaped handle 18 fixed thereto with a first leg 18a of the handle projecting generally radially outward from the shaft, and a second leg 18b of the handle running a short distance parallel to the shaft 14 in an outward direction away from the respective end of the shaft. This second leg 18b of the handle forms a gripping portion by which a user can crank the handle around the axis of the shaft to drive rotation thereof.

A generally rectangular sheet of flexible material has one horizontal end fixed to the shaft, and winds therearound. The handle-driven rotatable shaft thus forms a reel operable to deploy a free horizontal end of the wound sheet from around the shaft under rotation in one direction, and retract the free end of the sheet back to the shaft under rotation in the opposite direction. The sheet thus forms a selectively deployable and retractable cover 20 that hangs down over the window 100 when deployed to provide protection of the same.

At the free end of the cover sheet 20, a rigid rod, bar, shaft or length of tubing 22 is fixed to the cover sheet to run across the free end thereof, defining a weight that tends to pull this free end of the cover sheet downward and also defining a retaining element that is cooperable with retaining members 24 mounted on the front wall 130 of the operator cabin 120 below the front window 100 to hold the cover sheet in a closed position spanning downwardly over the full window from the reel, where a remainder of the cover sheet remains wrapped around the reel shaft 14.

In the embodiment of FIGS. 1 to 7, the two retaining members 24 are fixed to a common mounting plate 23 at spaced apart locations therealong. The mounting plate 23 is of strip-like elongated shape running along the horizontal bottom end of the window at a distance therebelow, whereby the two retaining members are spaced apart from one another along the width dimension of the window. The mounting plate may feature bolt holes 23a passing through it at positions spaced along the mounting plate for fastening of the mounting plate to the front wall of the operator cabin, either directly or indirectly.

The retaining members 24 of the first embodiment are respective pieces of square U-shaped channel projecting longitudinally forward from the front side of the mounting plate 23 in parallel horizontal directions to define a pair of lugs for retaining the rod 22 of the cover sheet when closed over the window so as to secure the cover sheet 20 in this closed position. The open side of each illustrated piece's U-shaped cross section faces downward between parallel vertical side walls 24a of the channel. Matching slots 24b are provided in the side walls, cutting into the side walls 24a at the distal ends thereof lying opposite the mounting plate 23 at an inclined angle sloping upwardly toward the mounting plate 23.

A pair of rectangular cutouts 25 are provided in the cover sheet 20, jutting into the cover sheet at the bottom end thereof that is fixed to the rod 22, thus each defining an opening between the rod 22 and an opposing inner end 25a of the cutout. The spacing between the two cutouts 25 along the rod corresponds to the spacing between the two retaining members 24 along the mounting plate 23, and the mounting plate 23 and housing 26 are mounted at horizontally matching positions such that each cutout aligns with a respective one of the retaining members 24 (i.e. a vertical plane perpendicular to the shaft 14 and rod 22 and containing the longitudinal axis of a respective retaining member 24 cuts through a respective one of the cutouts 25).

A width of the slot 24b in each retaining member exceeds a diameter of the rod 22 carried on the cover sheet at all points along the length of the slot. As best shown in FIG. 6, at the open end of the slot 24b, the slot width is at its greatest, and the linear top and bottom edges 24c, 24d of the slot slope upward from this end at a small acute angle relative to one another so as to slightly converge as they extend toward the mounting plate 23. Accordingly, moving toward the mounting plate, the slot 24 initially grows narrower between these two linear edges 24c, 24d. The closed end of the slot 24a is defined by an arcuately curved edge 24e that spans over 180-degrees and joins relatively smoothly with the linear top edge of the slot so as not to define a notable point or corner where they join. However, the curved edge 24e joins notably non-continuously with the linear bottom edge to form an upward pointing corner or apex 24f at the intersection therewith. The radius of the arcuate curved inner edge 24e of the slot slightly exceeds that of the rod 22. This forms a rounded seat adjacent the closed end of the slot.

The support frame or housing 26 that carries the shaft 14 features a rear wall 26a spanning a substantial portion of the shaft length in a vertical plane parallel to the shaft 14, and a pair of side walls 28a, 28b jut forwardly from the rear wall at opposite ends thereof. The shaft 14 extends through a pair of aligned through-holes in these side walls 28b for rotation about the coincident axes of these holes a short distance in front of the rear wall 26a. The shaft may be supported for rotation in the holes of the side walls by bushings or bearings in or aligned with the through-holes of the side walls. The cover sheet 20 is fastened to the reel shaft 14 in the gap left between the two side walls 28a, 28b, for example by nut and bolt fasteners passing through the sheet and diametrically through the shaft at spaced locations therealong. As shown, the housing 26 may feature a cover or top wall 26b spanning forwardly over the shaft 14 from the rear wall 26a, and spanning laterally between the two side walls 28a, 28b.

Laterally outward from the one of the side walls 28b nearest the shaft handle 18, at a position between the handle 18 and this side wall 28b of the housing 26, a ratchet gear or ratchet wheel 30 is fixed to the shaft 14 for rotation therewith. A pawl 32 is carried on the side wall 28b by a bolt or pivot pin 34, whose axis lies parallel to that of the shaft 14. The pivotal support of the pawl 32 is suitably positioned relative to the ratchet gear to gravity-bias the working feature of the pawl into contact with the saw-toothed profile of the ratchet gear, unless the pawl is manually rotated over-center to a non-working position in which the working feature of the pawl points away from the ratchet gear. Until manually moved the non-working position, the pawl acts to block rotation of the ratchet gear (and thus the shaft) in the direction that unwinds the cover sheet 20 from the shaft. Rotation in the opposite direction, acting to wind the cover sheet further onto the shaft is always allowed, with the pawl acting to automatically lock the shaft against unwinding of cover after each incremental rotation of the reel shaft in the winding direction, unless the mechanism is unlocked by manual movement of the pawl into the non-working position. As shown, the pawl 32 may feature its own handle grip 32a lying parallel to the gripping portion 18b of the shaft-rotating handle 18 for easy convenient manipulation of the pawl between the working and non-working positions.

Operation of the window protection apparatus is now described as follows. With the cover sheet in an open position fully retracted onto the reel above the window, as shown in FIGS. 1 and 2, the ratchet mechanism will lock the reel against deployment of the sheet downward over the window. Accordingly, provided that the pawl is in its normal working position, the skid steer can be used with full visibility through the front window without fear of the window cover being inadvertently deployed. When the machine is loaded onto a trailer and ready for transport, the ratchet is released or unlocked by manually moving the pawl to the non-working position. The rod 22 and the free end of the cover sheet attached thereto are grasped, and pulled downward fully over the window, as shown by arrow A of FIG. 2, to partially extend the cover sheet from the shaft so as to reach downwardly to near the retaining members 24, as shown in FIG. 5. The rod 22 at this free bottom end of the sheet is then inserted into the slots 24a of the retaining members 24 via the open ends of the slots at the forward ends of the retaining members 24. Being slid further into the slots toward the closed ends thereof, the rod passes over the apex 24f at the intermediate location along the bottom of the slot, and rides over the apex 24f onto the seat or cradle formed by the rounded inner end of the slot. Having seated the rod 22 at the rounded end of the slot in this manner, the apex 24f jutting upward at the lower front quadrant of the rod's circumference blocks the rod 22 from inadvertently sliding of out of the slots 24b.

In the above process, instead of manually pulling the sheet downward from the open position, the reel handle 18 may instead be used to deploy the cover sheet 20, or the weight of the rod 22 at the free end of the sheet 20 may be sufficient to gravity-feed the sheet downwardly over the window.

With the rod 22 received in the slots of the retaining members 24 and the sheet now covering the window, the ratchet mechanism is then re-engaged by returning the pawl to the working position, and the handle is turned in the cover-winding direction to tension the cover sheet between the reel shaft above the window and the retaining members below the window. That is, the tensioning of the cover sheet pulls the retaining rod 22 up against the rounded topside of the inner end of each slot 24b, thereby eliminating any slack in the cover sheet, or at least reducing the slack to an amount insufficient to the allow the rod 22 to slide downwardly and forwarding out of the open forward ends of the slots 24b. With sufficient tension, the cover sheet blocks stones or other projectiles from reaching the window behind it and from deflecting the cover sheet sufficiently far back to impact the window. The cover member can thus be relatively thin and rely on tension to rebound projectiles away from the window, rather than relying on a padding effect that would require a thicker flexible material. Prototypes of the invention have employed a plastic mesh material conventionally used for gravel screening on gravel trucks, which has been found to provide some degree of give when tensioned, while keeping the cover thickness relatively low.

When window protection is no longer required, for example once the machine is transported to a location where it is to be unloaded, for example another work site or a storage location, the ratchet mechanism is again released by movement of the pawl to the non-working position, the retaining rod 22 at the free end of the sheet is disengaged from the retaining members 24 on the operator cabin, and the handle is used to rotate the shaft of the reel in the direction winding the cover sheet fully back on the reel above the window. Accordingly, full visibility through the window is regained by this retraction of the cover to allow for safe and confident driving of the machine, whether just for unloading and parking, or for actual use of the working machine.

Figure 9:
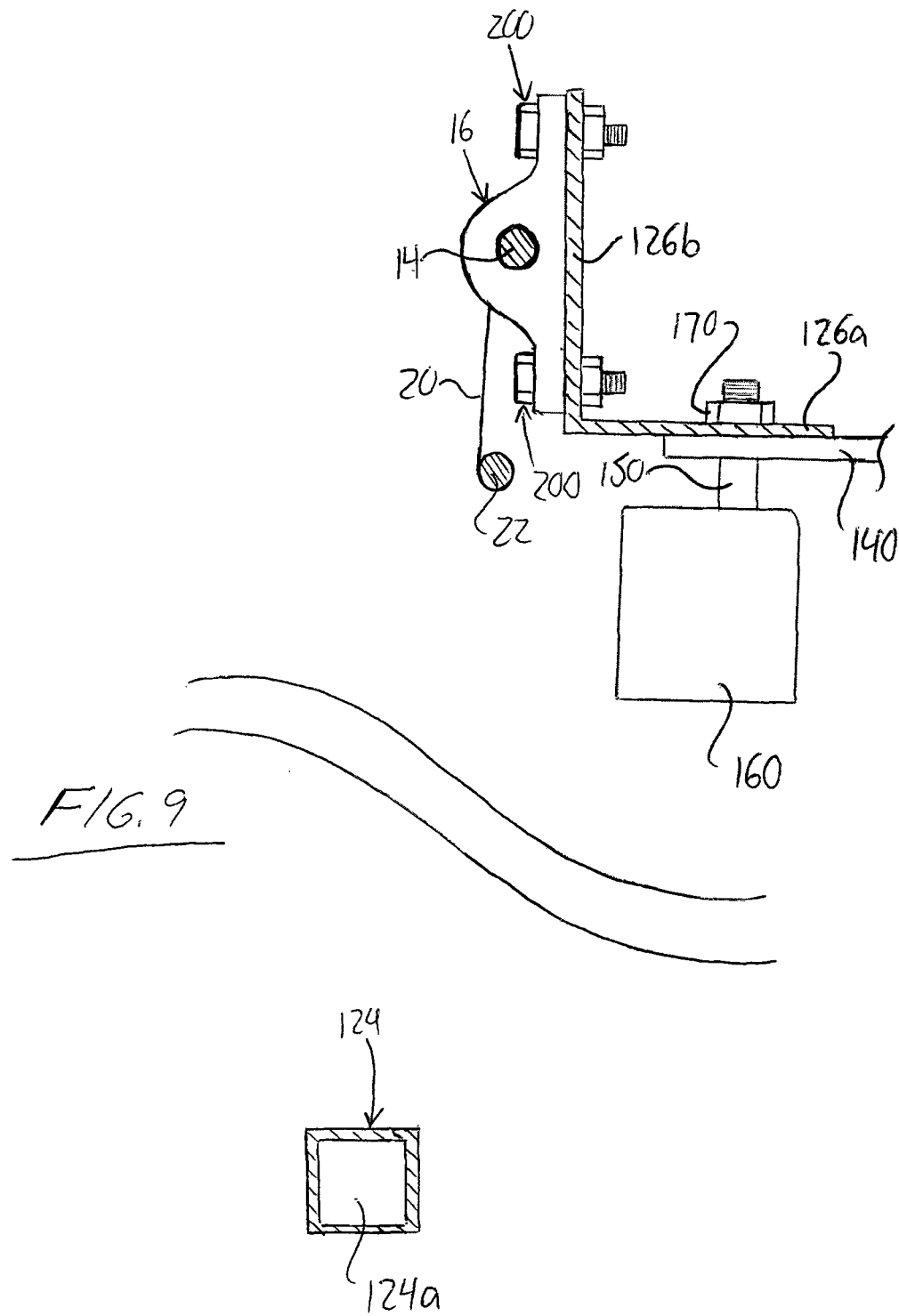
FIG. 9 is a cross-sectional view of the second embodiment window protection apparatus as taken along line IX-IX of FIG. 8.

FIGS. 8 and 9 show an alternate embodiment in which the housing of the first embodiment is replaced with an angle iron mounting bracket 126 featuring a horizontal leg 126a and a vertical leg 126b standing upward therefrom at the front end of the horizontal leg 126a. When the bracket is installed, the position of the vertical leg 126b substantially matches that of the rear housing wall 26a of the first embodiment so as to lie in a vertical plane with an elongated rectangular shape running horizontally parallel to the top perimeter edge of the window 100 of the operator cabin 120 at a short height thereabove. A pair of pillow-block bearings 16 are fixed to the vertical leg 126a of the mounting bracket 126 near opposite ends thereof so as to jut forwardly therefrom to rotatably carry the reel shaft 14 a short distance in front of the mounting bracket 126 on opposite sides of the window 100 at a height thereabove.

Laterally outward from the one of the bearings 16 nearest the shaft handle 18, at a position between the handle and this bearing, a small vertical plate 128 juts perpendicularly forward from the vertical leg 26b of the mounting bracket, and acts in the same manner as side wall 28b of the first embodiment to carry the pawl 32 to act on a ratchet gear 30 that is fixed to the shaft 14 at the outer side of this vertical wall or plate 128.

Instead of the slotted retaining members 24 of the first embodiment that reside directly below the bottom perimeter edge of the window 100 and projecting longitudinally forwardly from the operator cabin, the second embodiment features rectangular-tubing retaining members 124 whose longitudinal axes instead lie cross-wise of the vehicle. These tubular retaining members 124 are mounted on the front wall 130 of the operator cabin 120 below the front window 100, but laterally offset therefrom to reside on opposite sides thereof with their inner ends opening toward one another across the width of the window at an elevation therebelow. The retaining members may be attached directly or indirectly to the operator cabin, for example by welding or other fastening means. The retaining members 124 once again act to hold the cover sheet in a closed position spanning downwardly over the full window from the reel, where a remainder of the cover sheet remains wrapped around the reel shaft 14.

Inner ends of the tubular retaining members 124 open toward one another across the width of the window at an elevation therebelow. The hollow interior 124a of each piece of tubing on the operator cabin is of greater cross-sectional size than the exterior of the solid or tubular rod 22 at the free end of the cover sheet 20, whereby each end of the rod 22 projecting laterally out from the free end of the cover sheet can be inserted into the cabin-mounted tubing piece 124 on the respective side of the operator window 100. With these features on the cover sheet and operator cabin engaged, the cabin-mounted tubular retaining member 124 closes fully around the opening in which the sheet-carried rod 22 is nested, thereby blocking movement of the free end the sheet 20 up or down. The cabin-mounted tubular retaining members 24 are mounted at the same height on the operator cabin wall 130 to hold the sheet mounted tubing piece 22 horizontally, but are sufficiently far apart from one another with large enough interior cross-sections so that the sheet mounted rod 22 can be inserted and withdrawn into and out of each cabin-mounted tubing piece 24. Since the retaining members 124 of the second embodiment only engage the rod 22 at the ends thereof that project laterally beyond the horizontal span of the cover sheet 20, the cover sheet cutouts 25 of the first embodiment are not required.

As shown in FIG. 8, the inner end 124b of each tubular retaining member 124 may be obliquely cut so as to make the top wall of the tubular member longer than the opposing bottom wall. At the bottom of their open inner ends, the tubular members 124 are thus farther apart than at the top, thereby making it easier to insert the each end of the rod 22 into the respective tubular retaining member 124 by pulling the cover sheet down sufficiently far to insert the rod 22 into the tubular members at the lower extent of their hollow interiors 124a. Under winding of the cover sheet after this insertion of the rod 22, the rod will be pulled up against the top walls of the hollow interior's 124a of tubular retaining members 124, whereupon the winding tensions the cover sheet.

It will be appreciated that lug-type features projecting outward from the operator cabin to provide suitable holes, slots or openings for receiving ends of the sheet-carried retaining piece 22 may be formed by means other than fastening of pieces of channel or tubing to the cabin wall, for example by welding hole-equipped or slot-equipped plate-shaped ears to the cabin in similar positions to the retaining members 24, 124 described above for the illustrated embodiments. Where the retaining member type of the second embodiment is employed, the members may be individually mounted as illustrated, or mounted together as a single unit, for example being carried on a single mounting plate, much like in the first embodiment.

The mounting bracket 126 is mounted to a skid steer or other working machine having two headlamp mounts 140 projecting forwardly from the operator cabin 120' at spaced positions thereacross at or near the top of the cabin's front wall 130 to carry headlamps of the working machine. Each headlamp mount 140 is a flat plate projecting horizontally and forwardly away from a connection of this plate to the operator cabin. A vertical through-hole in the headlamp mounting plate 140 accommodates passage therethrough of a threaded stem 150 projecting upward from a top of a headlamp housing 160, such that threading of a nut 170 onto this bolt stem 150 above the mounting plate 140 acts to connect the headlamp to the mount in a position suspended therefrom.

The horizontal leg 126a of the mounting bracket 126 of the reel assembly of the second embodiment features two through-holes passing vertically through it at spaced positions along the bracket, so that each of these bracket holes can overlie the hole in a respective one of the headlamp mounts 140 under placement of the horizontal leg of the reel's mounting bracket 126 atop the two headlamp mounts 140. This way, the bolt stem 150 of each headlamp can be passed upwardly through both the machine's existing headlamp mount 140 and the horizontal leg 26a of the reel bracket 126 so that the threading of the nut 170 onto the bolt stem not only secures the headlamp in place, but additionally clamps the reel bracket 126 down on the headlamp mounts in order to fasten the reel assembly to the machine. FIG. 9 also illustrates how the bearings 16 may be releasably attached to a mounting bracket 126 using nut and bolt fasteners 200, but other modes of attachment may alternatively be employed. The use of existing mounting or fastening features on the operator cabin of the working machine to install the reel assembly not only allows easy installation and removal of the reel assembly using conventional fasteners, as opposed to a permanent mounting technique such as welding, but also avoids the need to in any way modify the machine to accommodate fastening of the reel assembly in place.

The housing or support frame 26 of the first embodiment may be mounted to the operator cabin of a working machine using a right angle mounting bracket 126 like that of the second embodiment, for example by bolting the rear wall 26a of the housing 26 to the vertical leg 126b of the mounting bracket in place of the pillow block bearings 16 of the second embodiment via bolt hole 26c in the rear wall 26a of the first embodiment housing 26.

However, it will be appreciated that other mounting techniques, whether or not they use existing mounting or fastener-accommodating features of the working machine, may alternatively be used to install the present invention on an existing machine. The present invention may alternatively be incorporated as a factory-produced feature of the working machine as opposed to an optional add-on or aftermarket accessory. Accordingly, the scope of the present invention includes embodiments that lack a mounting bracket or housing for post-factory installation on the operator cabin to carry the rotatable shaft and the pawl of the ratchet mechanism, wherein support or mounting features for the shaft and pawl are instead be factory-provided feature of the operator cabin of the working machine.

The positioning of the reel over the window means that gravity aids in deployment of the cover sheet from the reel when the reel is not locked by the ratchet mechanism. With sufficient weight at the free end of the sheet, for example provided by the rigid member running across the free end of the sheet for use in securing the same to the operator cabin when in the closed position, the cover sheet may even be self- or automatically-deployed. The rigidity of the member across the bottom of the sheet also cooperates with the horizontal orientation of the reel shaft to ensure the bottom of the deployed sheet spreads fully across the width of the window. The weight of this member also resists twisting or flailing of the cover sheet in windy conditions.

While the illustrated embodiment employs a manually operated reel lacking any non-human power source, other embodiments may incorporate a powered reel drive, for example an employing electric or hydraulic motor. A hydraulically powered embodiment may make use of an existing hydraulic system of the working machine, with an electric embodiment likewise having the possibility of being powered by an existing electrical system of the vehicle, or being powered by an independent power source (e.g. a dedicated battery or battery pack).

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. In combination, a working machine and a window protection apparatus for an operator cabin of said working machine, the operator cabin of the working machine comprising a headlamp mounting arrangement that is defined above a window of said operator cabin at an exterior thereof and includes a predefined first pair of fastening features spaced apart from one another by a first distance and normally used for mounting of headlamps to the working machine above said window, wherein the window protection apparatus comprises:
   a mount having a second pair of fastening features defined thereon that are spaced apart from one another by a second distance that matches the first distance for alignment of the second pair of fastening features on the mount with the first pair of fastening features on the working machine to enable fastening of the mount to the working machine via said aligned first and second pairs of fastening features to support the mount at the exterior of the operator cabin in a position above the window of said operator cabin;
   a flexible window covering carried on the mount at position thereon that is arranged to reside at a spaced distance outwardly from the window of said operator cabin when said mount is supported at the exterior thereof, the flexible window covering being supported in a deployable and retractable manner for selective deployment of the window covering away from the mount and retraction of the window covering back toward the mount; and
   a retaining member arranged for mounting at the exterior of the operator cabin in a position proximate a bottom end of the window of said operator cabin;
   a retaining element on the window covering proximate a free end thereof and engagable with the retaining member at a point thereon that is arranged to be spaced outwardly from the window of said operator cabin when said retaining member is mounted at the exterior of said operator cabin such that the window covering is secured in a closed position spanning over the window at a location spaced outwardly therefrom; and
   a tensioning mechanism operable to place the window covering in a tensioned state within the closed position at the location spaced outwardly from the window of the operator cabin, whereby the tensioned state of the covering member in the closed position is operable to prevent both an impact of the window of the operator cabin by a projectile and a deflection of said window covering against said window by said projectile.

2. The apparatus of claim 1 comprising a reel that carries the window covering and is rotatable on the in a first direction for deployment of the window covering and rotatable in a second direction for retraction of the window covering.

3. The apparatus of claim 2 comprising a ratchet mechanism operable in an engaged position to prevent rotation of the reel in only the first direction, whereby rotation of the reel in the second direction with the window covering in the closed position and the ratchet mechanism engaged acts to tension the window covering.

4. The apparatus of claim 1 wherein the retaining member is arranged to mount to a wall of the operator cabin at which the window is mounted, and comprises a lug arranged to project from the operator cabin and define an opening into which the retaining element is receivable.

5. The apparatus of claim 1 wherein the first pair of fastening features comprise a pair of openings for fastening of the mount and the headlamp mounting arrangement through said pair of holes.

6. The apparatus of claim 1 wherein the second pair of fastening features comprise a pair of holes for fastening of the mount and the headlamp mounting arrangement through said pair of openings.

7. The apparatus of claim 1 wherein the first and second pairs of fastening features are engaged together by threaded fasteners.

8. A window protection apparatus on a working machine having an operator cabin with a window and a headlamp mounting arrangement that is defined above said window at an exterior of the operator cabin and normally used for mounting of headlamps to the working machine, the window protection apparatus comprising:
   a mount supported at the exterior of the operator cabin in a position above the window of the operator cabin by a fastening of said mount to the predefined headlamp mounting arrangement;
   a flexible window covering carried on the mount at the spaced distance outward from said window of the operator cabin in a deployable and retractable manner for selective deployment of the window covering away from the mount and retraction of the window covering back toward the mount;
   a retaining member mounted at the exterior of the operator cabin in a position proximate a bottom end of the window and reaching a point spaced outwardly from the window of the operator cabin; and
   a retaining element on the window covering proximate a free end thereof and engagable with the retaining member at the point spaced outwardly from the window of the operator cabin to secure the window covering in a closed position spanning over the window at a location spaced outwardly therefrom; and a tensioning mechanism operable to place the window covering in a tensioned state within the closed position at the location spaced outwardly from the window of the operator cabin, whereby the tensioned state of the covering member in the closed position is operable to prevent both an impact of the window of the operator cabin by a projectile and a deflection of said window covering against said window by said projectile.

9. The apparatus of claim 8 comprising a reel that carries the window covering and is rotatable in a first direction for deployment of the window covering and rotatable in a second direction for retraction of the window covering.

10. The apparatus of claim 9 comprising a ratchet mechanism operable in an engaged position to prevent rotation of the reel in only the first direction, whereby rotation of the reel in the second direction with the window covering in the closed position and the ratchet mechanism engaged acts to tension the window covering.

11. The apparatus of claim 8 wherein the retaining member comprises a lug arranged to project from the operator cabin and define an opening into which the retaining element is receivable.

12. The apparatus of claim 8 comprising threaded fasteners attaching the mount to the headlamp mounting arrangement via aligned fastener holes of the mount and the headlamp mounting arrangement.

13. The apparatus of claim 8 wherein the headlamp mounting arrangement comprises openings via which the mount and the headlamp mounting arrangement are fastened together.

14. The apparatus of claim 8 wherein the mount comprises holes via which the mount and the headlamp mounting arrangement are fastened together.

15. The apparatus of claim 8 in combination with the working machine and an open air trailer, the working machine being parked on the open air trailer for transport thereon, and the window covering being in the tensioned state and closed position over the window of the operator cabin of the working machine at the location spaced outwardly therefrom in order to prevent damage to the window during transport on the open air trailer.

16. A method of protecting a window of an operator cabin of a working machine, the method comprising mounting a window protection apparatus to an exterior of operator cabin of the working machine at a position over the window thereof by fastening a mount of the window protection apparatus to a predefined headlamp mounting arrangement of the working machine that is located at the exterior of the operator cabin above the window thereof, wherein the window protection apparatus comprises a window covering carried on the mount and deployable into a closed position spanning downwardly from the mount over said window of the operator cabin in a tensioned state at a distance spaced outwardly from said window to prevent both an impact of said window by a projectile, and a deflection of the window covering against said window by said projectile.

17. The method of claim 16 comprising deploying the window covering into the closed position and the tensioned state and transporting said working machine on an open air trailer with the window covering in said closed position and said tensioned state.

18. The method of claim 16 comprising removing headlamps from the working machine before mounting the window protection apparatus thereto, and subsequently reinstalling the headlamps on the working machine after mounting of the window protection apparatus.

19. The method of claim 18 wherein reinstalling the headlamps comprises securing the headlamps to the working machine via the mount.

* * * * *